United States Patent [19]

Wilson, Jr.

[11] Patent Number: 4,845,317

[45] Date of Patent: Jul. 4, 1989

[54] THREADED INSULATOR

[75] Inventor: Robert M. Wilson, Jr., Battle Creek, Mich.

[73] Assignee: Dare Products, Inc., Battle Creek, Mich.

[21] Appl. No.: 140,485

[22] Filed: Jan. 4, 1988

[51] Int. Cl.[4] ........................ H01B 17/14; A01K 3/00

[52] U.S. Cl. ................................ 174/163 F; 248/73; 256/10; 256/48; 411/187; 411/385; 411/392

[58] Field of Search ............... 411/400, 366, 385, 907, 411/908, 383, 392, 401, 414, 419, 187; 248/73; 174/158 F, 161 F, 163 F; 256/48, 10, 50, 53–55

[56] References Cited

U.S. PATENT DOCUMENTS

| | | | |
|---|---|---|---|
| 814,613 | 3/1905 | MacKean | 411/419 X |
| 2,195,685 | 4/1940 | Schneider | 411/385 |
| 2,208,532 | 7/1940 | Woodward | 411/187 |
| 3,092,884 | 6/1963 | Elms | 411/385 X |
| 3,172,238 | 3/1965 | Sandin | 411/385 X |
| 3,689,686 | 9/1972 | Wilson | 174/158 F X |
| 3,749,820 | 7/1973 | Langlie et al. | 174/163 F |
| 3,913,888 | 10/1975 | Maranell | 174/158 F X |
| 4,077,611 | 3/1978 | Wilson | 256/10 |
| 4,171,523 | 10/1979 | Parkitny | 256/10 X |
| 4,623,756 | 11/1986 | Wilson, Jr. | 174/158 F |

FOREIGN PATENT DOCUMENTS

| | | | |
|---|---|---|---|
| 175818 | 3/1917 | Canada | 411/385 |
| 662785 | 7/1938 | Fed. Rep. of Germany | 174/163 F |
| 889187 | 9/1943 | France | 411/419 |
| 312604 | 3/1956 | Switzerland | 411/419 |
| 1016302 | 1/1966 | United Kingdom | 174/163 F |
| 2024358 | 1/1980 | United Kingdom | 411/392 |

*Primary Examiner*—Lloyd A. Gall
*Attorney, Agent, or Firm*—Gifford, Groh, Sheridan, Sprinkle and Dolgorukov

[57] ABSTRACT

An insulator and wire mounting structure for supporting an electrically conductive fence wire from a metal fence post having a generally T-shaped cross-section. The insulator and wire supporting member has a pair of leg portions which are deformable relative to each other to receive an intermediate portion of the T-post and after being brought into parallel alignment with each other receive a nut which threadably engages a thread set to tighten the mounting structure in position for supporting the wire.

11 Claims, 1 Drawing Sheet

THREADED INSULATOR

BACKGROUND OF THE INVENTION

FIELD OF THE INVENTION

This invention relates to electric fence wire mounting and insulating structures and more particularly to such structures which are adapted for mounting on metal T-posts.

Electric fence wire mounting structures are commonly made of electrically non-conductive plastic materials for mounting on metal fence posts to support the electrically charged wires so that the wires are supported in an elevated position and are well insulated from the metal posts. The provision of mounting structures for T-posts having a flange and stem is further complicated because T-posts vary substantially in dimensions from one manufacturer to another. It is desirable that the same mounting and insulating structure can be used with any of the available of T-post types so that an inventory of different shapes and sizes of insulator units is not required by either the manufacturer or the user.

Many insulator units which are used with metal posts having various shapes in cross-section require mounting from one end of the post making it impossible to add insulators for additional wires below any existing wire.

Two-part insulators of the type having a threaded portion to receive a nut which permits locking the insulator in a selected position on the post also have similar difficulties in that they usually require mounting from one end of the post.

SUMMARY OF THE INVENTION

It therefore is a general object of this invention to provide a threaded electric fence insulator which can be mounted to a selected intermediate portion of a fence post without obstruction of existing insulators or wire.

Another object of the invention is to provide an insulator which can be mounted to a T-post without necessitating the use of tools.

Another object of the invention is to provide a fence wire insulating device which will accomodate variations in the cross-sectional configuration and overall dimensions of T-posts.

A wire supporting insulator for holding an electrically conductive wire in insulated relationship relative to a metal T-post is provided which can be attached to fence posts without the use of tools and to an intermediate portion of the post. The insulator includes a supporting bracket of general U-shaped configuration with the ends of the leg portions forming a thread set to receive a nut holding the legs together with the closed portion of the U-shaped member and the nut encircling the T-post to lock the insulator in position or to limit its movement between uniformly spaced lugs on the flange or cross bar portion of the T-shaped cross-section.

BRIEF DESCRIPTION OF THE DRAWINGS

The objects of this invention are accomplished by the preferred embodiment disclosed in the following description and illustrated in the drawings in which.

DESCRIPTION OF THE PREFERRED EMBODIMENTS

Figure 1:
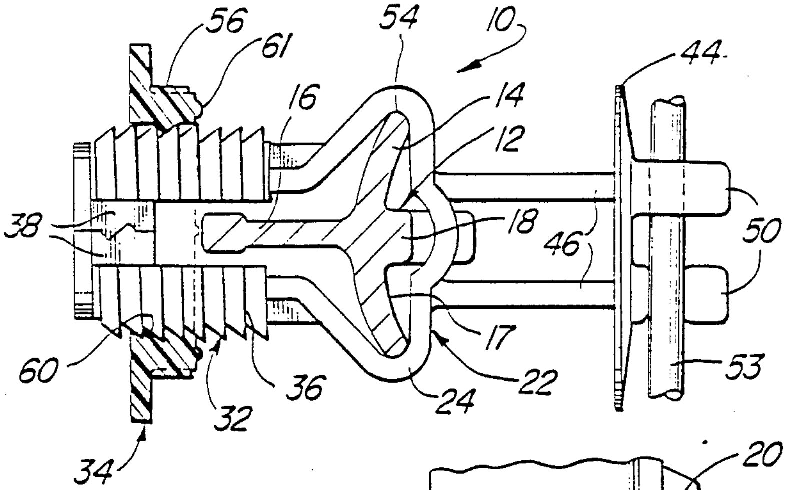
FIG. 1 is a top plan view of the insulator of the present invention installed on a T-post.
Figure 2:
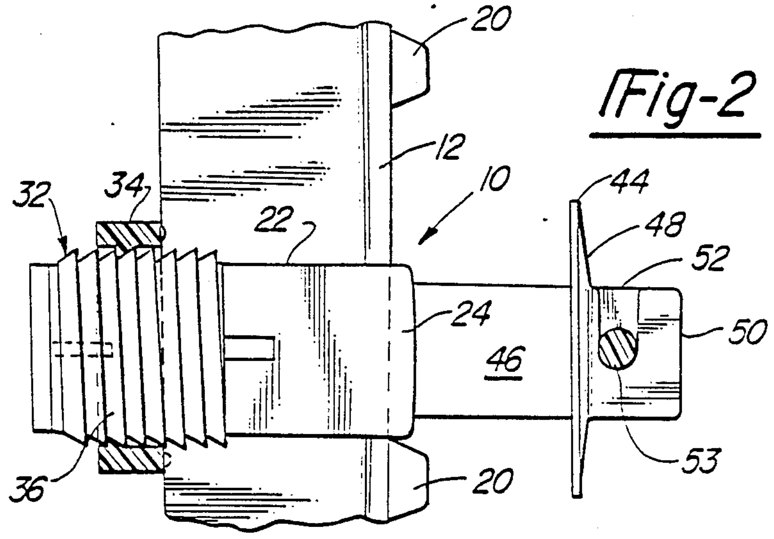
FIG. 2 is a side elevation of the arrangement shown in FIG. 1.
Figure 5:
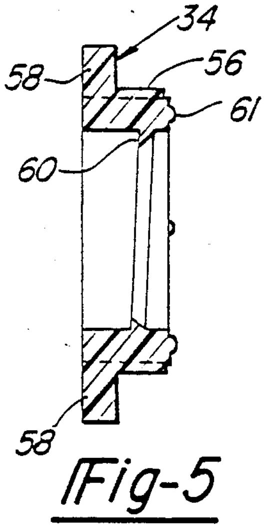
FIG. 5 is a cross sectional view of the nut of the insulator seen also in FIG. 1.
Figure 4:
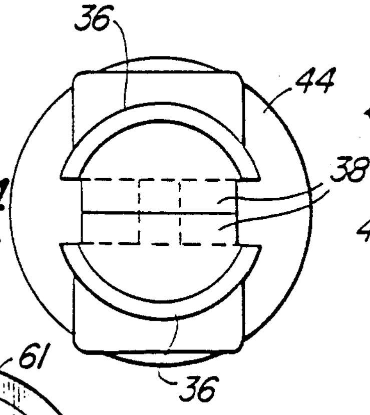
FIG. 4 is an end view as viewed from the left end of FIG. 4 with the T-post removed.

The electric fence insulator of this invention is designated generally at 10 and is molded from a weatherproof, electrically insulating, resilient plastic material. The insulator 10 is shown mounted on a metal fence post 12 having a generally T-shaped cross-section which may vary in dimensions. The T-shaped configuration shown in the drawings has a cross-bar or flange 14 which is intersected by a stem portion 16. The forward face or top surface 17 of the flange 14 is provided with a rib 18 in alignment with the stem member 16. Rib 18 also is provided with uniformly spaced studs 20 extending longitudinally of the post. Overall dimensions of the flange 14 and of the stem member 16 vary substantially from one manufacturer to another and the insulator 10 must be able to conform to posts with these varying cross-sections in order to be of the greatest utility. The insulator is adapted to be mounted on the post 12 between studs or lugs 20 which limit any relative vertical movement of the insulator 20 with the post 12.

The insulator 10 includes a generally U-shaped yoke or support bracket 22 having a bight portion 24 generally coextensive with the flange 14 of the post 12. A pair of legs 26 extend from opposite ends of the bight portion 24. The legs 26 each have first portions 28 which extend to opposite sides of the post 12 and converge towards each other and second leg portions 30 which extend from the first portions. In the as-mounted position of the insulator 10, the second leg portions 30 extend generally parallel to each other and form a single thread set 32 for receiving an internally threaded nut element indicated generally at 34. The thread set 32 forms an interrupted thread.

Thread portions 36 formed on each of the leg portions 30 are maintained in generally parallel relationship to each other and also axially aligned by spacer elements 38 formed integrally with the remainder of the insulator 10. Each of the spacer elements 38 has an irregular surface configuration 40 complementary to the irregular surface on the other of the leg portions 30. When the surfaces 40 are in engagement with each other, they serve to insure axial alignment of the threaded portions 36 as well as maintaining the threaded portions 36 in generally parallel relationship to each other.

A base member 44 is supported in spaced relationship from the bight portion 24 of the bracket 22 by a pair of parallel extending struts 46 which are disposed parallel to each other and formed integrally with the bight portion 24 and the base member 44. The forward face 48 of the base member is provided with a pair of wire support fingers 50. Each of the fingers 50 are generally U-shaped and are provided with a slot 52 for receiving a wire 53. One slot 52 of one of the finger opens upwardly and the other slot 52 of the other finger 50 opens downwardly so that one finger 50 limits vertical downward movement of a wire 53 resting in the slot and the other finger 50 limits the vertical upward movement of the wire. The spacing of the fingers 50 is sufficient to receive a section of wire vertically which when turned to a horizontal position will hold the wire in the slots 52 of the pair of fingers 50.

The bracket 22 is sufficiently flexible so that the legs 26 may be flexed apart to receive a T-post 12 therebetween. Flexing is facilitated by forming a notch 54 at the juncture of at least one of the leg members 26 and the end of the bight 24. The notch 54 acts as a hinge point to provide easier opening of the legs 26 relative to each other.

The nut 34 preferably has a collar 56 having diametrically opposed lugs 58 facilitating grip for rotation in either a closing or opening direction without the use of tools. The inside of the collar 56 is formed with a single internal thread 60 which is complementary to the multiple threads on the bracket 22. Preferably the threads 36 of the thread set 32 and the thread 60 are of the buttress type.

The insulator 10 is attached to a fence post 12 to occupy the illustrated position by initially spreading the legs 26 so that the bracket 22 is placed in position between studs 20 with the flange 14 of the T-post against the bight portion 24. This typically positions the stem 16 of the post between the legs 26 and usually between the threaded portions 36 of the thread set 32. With the insulator 10 or bracket 22 encircling the post 12, the threaded portions 36 can be squeezed together to bring the spacer elements 38 into engagement with each other after which the nut 34 can be threaded on the thread set 32 made up by the threaded portions 36 on each of the leg portions of the bracket 22. The nut 34 can then be rotated by hand to bring it into engagement with the end of the stem portion 16 of the T-post 12. This serves to hold the bracket on mounting member 22 in position and at the same time permits the member to be moved a short distance vertically on the post between the studs 20.

The nut 34 is provided with protrustions 61 which engage the end of stem 16 and deflect when the nut 34 is threaded into position and serve to engage the side of the post stem 16 to prevent the nut 34 from rotating in a loosening direction. As a consequence, after the nut 34 is turned firmly in position it remains in that position.

Figure 3:
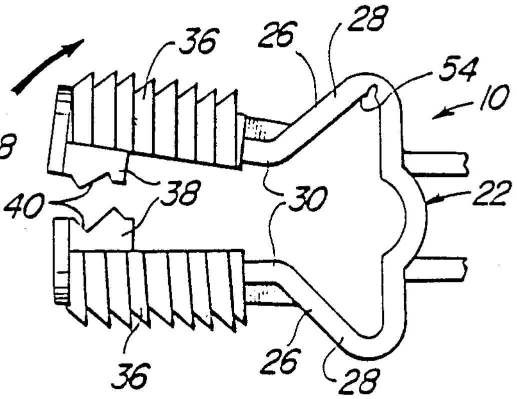
FIG. 3 is a top plan view of a portion of the insulator seen in FIG. 1 illustrating the insulator in its as-molded condition.
Figure 6:
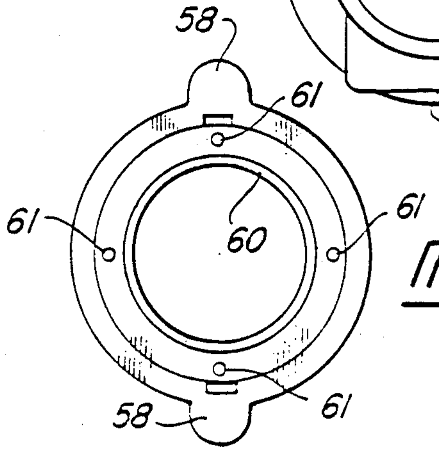
FIG. 6 is an end view of the nut seen in FIG. 5.

In the as-molded position as seen in FIG. 3, the threaded portions 36 on the leg portions 30 diverge slightly from each other to occupy a position such as that shown in the drawings. As a result when the threaded portions are moved into parallel relationship with each other and the nut 34 is placed in position, there is a tendency of leg portions 36 to return to their as-molded position thereby maintaining a tight fit between the thread set 32 and the thread 60 on the nut 34 to further resist movement of the nut in an unthreading direction.

The embodiments of the invention in which an exclusive property or privilege is claimed are defined as follows:

1. An insulator of plastic material for supporting an electrically conductive fence wire on a metal post comprising, mounting means including a generally U-shaped yoke having a bight portion adapted to be disposed at a forward face of said post, said yoke having a pair of legs adapted to extend at opposite sides of said post and from opposite ends of said bight portion, said legs being deflectable away from each other to receive an intermediate portion of said post therebetween, the ends of said legs forming a single thread set and being spaced apart a distance less than the overall cross sectional dimension of said post when said legs are positioned parallel to each other, a nut threadably engageable on said thread set to hold said legs together with said mounting means and nut completely encircling said post, and fence wire retaining means formed on said bight portion opposite to said mounting means for holding an electrically conducted fence wire relative to said post.

2. The insulator of claim 1 and further comprising a hinge point formed at the juncture of one of said legs and said bight portion to permit swinging of said legs away from each other to receive an intermediate portion of said post therebetween.

3. The insulator of claim 1 and further comprising locating means holding the threaded portion of said legs in predetermined spaced relationship to each other.

4. The insulator of claim 3 wherein said locating means includes engageable portions locating said threaded portions of said legs in axial alignment with each other to receive said nut.

5. The insulator of claim 1 wherein said nut is engageable with a portion of said post opposite to said bight portion when said nut is in a threaded position on said thread set.

6. An insulator for supporting an electrically conductive fence wire from a metal T-post having a generally T-shaped cross-section with a web portion and an intersecting stem member comprising:

a generally U-shaped mounting member having a bight portion substantially coextensive with a flange portion of said T-post, a pair of legs having end portions deflectable relative to each other and having first portions extending from the ends of said bight portion in converging relationship to each other and second portions extending from said first portions, said second portions being spaced apart a distance less than the overall cross-sectional dimension of said T-post when said second portions are disposed in substantially parallel relationship to each other, said second portions forming a single external thread set, an internally threaded element threadably engageable with said thread set to close the opening between said legs of said U-shaped mounting member to encircle said T-post, a guard member support from said mounting member, and a pair of spaced wire support fingers formed integrally on one side of said guard member opposite to said mounting member to support a wire generally horizontally and in transverse relationship to said T-post.

7. The insulator of claim 6 and further comprising a reduced portion at the juncture of said bight portion and one of said legs to permit deflection of said legs away from each other to receive an intermediate portion of said T-post.

8. The insulator of claim 6 and further comprising locating means holding said leg portions in predetermined spaced relationship to each other to form a recess adapted to receive the stem portion of said T-post therebetween.

9. The insulator of claim 6 wherein the ends of said pair of second leg portions forming said thread set are spaced apart to form a recess receiving the end of said T-post.

10. The insulator of claim 6 and further comprising means on said element engageable with said T-post to prevent rotation of said internally threaded element in the removal direction from said thread set.

11. The insulator of claim 10 wherein said means preventing rotation of said internally threaded element in the removal direction is a protrusion on said nut engageable with the stem of said T-post.

* * * * *